(12) United States Patent
Weber (10) Patent No.: US 6,315,658 B1
(45) Date of Patent: Nov. 13, 2001

(54) ARRANGEMENT FOR THE CONTROL OF THE FORWARD PROPULSION SPEED OF A HARVESTING MACHINE WITH FUZZY LOGIC

(75) Inventor: Konrad Andreas Weber, Siersburg (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/564,933

(22) Filed: May 4, 2000

(30) Foreign Application Priority Data

May 8, 1999 (DE) .............................................. 199 21 466

(51) Int. Cl.⁷ .................................................. A01D 41/00
(52) U.S. Cl. ............................................ 460/6; 56/10.2 G
(58) Field of Search ............................. 460/4, 6; 701/50, 701/53; 56/10.2 R, 10.2 A, 10.2 G, 10.2 H (56) References Cited

U.S. PATENT DOCUMENTS

| 3,514,929 | 6/1970 | Cornish et al. . |
| 4,487,002 | 12/1984 | Kruse et al. . |

FOREIGN PATENT DOCUMENTS

| 15 82 177 A | 3/1970 | (DE) . |
| 24 36 072 A | 2/1975 | (DE) . |
| 27 53 813 A | 7/1978 | (DE) . |
| 29 19 531 A | 1/1980 | (DE) . |
| 39 19 768 A | 1/1990 | (DE) . |
| 690 24 204 T | 1/1992 | (DE) . |
| 43 20 977 A | 1/1995 | (DE) . |
| 195 08 944 A | 9/1996 | (DE) . |
| 195 09 496 A | 9/1996 | (DE) . |
| 195 39 143 A | 4/1997 | (DE) . |
| 196 32 977 A | 2/1998 | (DE) . |
| 196 48 126 A | 5/1998 | (DE) . |
| 197 40 346 A | 3/1999 | (DE) . |
| 0 377 163 A | 7/1993 | (EP) . |
| 0 812 530 A | 12/1997 | (EP) . |
| 2 155 666 A | 9/1985 | (GB) . |

Primary Examiner—Robert E. Pezzuto (57) ABSTRACT

A crop harvesting machine is equipped with a crop intake arrangement which delivers crop to a crop processing arrangement. In order to maintain a substantially constant flow of crop to the crop processing arrangement despite a variance in the amount of crop located in various locations on a field, a control circuit employing non-precise or fuzzy logic controls the forward propulsion speed of the harvesting machine and/or the speed of a conveyor used to unload a buffer or crop accumulator that is mounted upstream from the crop processing arrangement. This control is based on crop flow data obtained by a sensor that senses the rate and/or the amount of a crop taken up by the crop intake arrangement, and by a fill sensor associated with a buffer which temporarily accumulates crop at a location upstream from the crop processing arrangement.

11 Claims, 7 Drawing Sheets

ARRANGEMENT FOR THE CONTROL OF THE FORWARD PROPULSION SPEED OF A HARVESTING MACHINE WITH FUZZY LOGIC

The invention concerns an arrangement for the control of the forward propulsion speed of a harvesting machine.

BACKGROUND OF THE INVENTION

Various control arrangements are known from the state of the art with which the forward propulsion speed or the intake velocity of an intake arrangement of a harvesting machine can be controlled.

EP-377163 A reveals a control arrangement of a harvesting machine in which the intake arrangement is driven at a speed that is proportional to the forward propulsion speed, where the proportionality factor is a function of the type of the particular intake arrangement. DE-19509496 A proposes that the rotational speed of the reel of a combine be controlled as a function of the forward propulsion speed according to a non-proportional characteristic, that is stored in a memory, which produces a higher speed advance for the reel at lower forward propulsion speed and a lower or smaller speed advance for the reel at higher forward propulsion speed. According to EP-812530 A, the rotational speed of the reel can also be a function of the height of the cut.

DE-2915531-A describes a harvesting machine in which the forward propulsion speed is controlled in such a way that a constant density of the grain loss material delivered by the harvesting machine results. Similarly, DE-2753813 A proposes the measurement of load changes in cutter, conveyor, threshing or separating arrangements of the combine and to use these for the control of the forward propulsion speed; the aforementioned load should remain constant. DE-2436072-A discloses a harvesting machine in which the forward part of the cutter head is provided with one or more touch sensor arrangements, which detect the amount of the crop to be processed and control the forward propulsion speed of the harvesting machine. According to DE-4320977-A, the measured grain separation at the thresher stator and the measured grain separation at a sieve of the separating arrangement are used to control the forward propulsion speed of a combine, which are used as a function of time.

DE-1582177-A reveals a combine in which the conveying speed of the intake arrangement is controlled as a function of the forward propulsion speed in such a way that a constant throughput of the crop is attained. IN GB-2155666-A, the forward propulsion speed is varied so that the rotational speed or the torque of a chopper drum remains constant.

U.S. Pat. No. 4,487,002 describes a combine that is provided with a sensor for the throughput of harvested crop, which measures the power applied to the slope conveyor. In addition, the rotational speed of the engine and the forward propulsion speed is measured. These measured values are transmitted to a control circuit that controls the forward propulsion speed and attempts to hold the engine at a constant controllable speed. If the load on the conveyor increases due to harvested crop beyond a threshold value, the actual forward propulsion speed is controlled primarily as a function of the rotational speed of the engine, so as to maintain the desired rotational speed. In case that the load does not increase above this threshold value, that is, no harvesting is performed, but operation on a road is performed, the actual forward propulsion speed is primarily a function of the selected vehicle speed. The combine is braked rapidly when a second threshold value of the throughput is exceeded, that is when a blockage is threatened.

Therefore, it is desirable that the forward propulsion speed of the harvesting machine is controlled in such a way that the power output of the engine or the rate at which the crop is processed remains approximately constant. Such a method of operation is particularly economical.

However the density or the height of the crop varies on occasion so sharply that the known control arrangements result in sudden jumps or frequent corrections to the speed. Upon sudden increases in the torque due to local increases in the density of the crop, the rotational speed of the engine drops and is followed by a correction in the forward propulsion speed. The result is that less crop is conveyed into the machine for a brief period and thereby the torque of the crop processing arrangement can again return to normal. From its torque reserve, the engine can again return to its original operating rotational speed by briefly increased fuel consumption. Her the increased fuel consumption as well as the mechanical loads on the driveline and torque transmitting components due to load fluctuations can be seen as detrimental. In addition, the continuing acceleration and retarding processes are uncomfortable for an operator sitting on the machine.

SUMMARY OF THE INVENTION

According to the present invention, there is provided a harvesting machine for taking up and processing crop and including controls which overcome the drawbacks of the prior art.

An object of the invention is to provide a harvesting machine having controls that take into account the non-linear character of the conveying of crop into the machine to be processed so that the main drive engine of the machine is operated at a constant load.

A more specific object of the invention is to provide a harvesting machine, as set forth in the immediately preceding object, wherein sensors are provided for determining the rate and/or the amount of crop taken up by a crop intake arrangement and to control the forward propulsion speed of the machine by using a fuzzy logic controller in such a way that the rate that crop is processed by a crop processing arrangement of the harvesting machine, for example the chopper drum of a forage harvester, or a cutter head arrangement, conveyor arrangement, thresher arrangement or separator arrangement of a combine corresponds to a target value. For the control of the forward propulsion speed a hydrostatic drive is used which incorporates a hydrostatic pump having a swashplate which may be controlled electronically either directly or through a servo motor.

Yet another object of the invention is to provide a harvesting machine, as set forth in the immediately preceding object, wherein the machine is also controlled so that the throughput reaches an optimum for each point in time, and that the machine can always operate close to the power limit, even under varying harvesting conditions. This is accomplished by using a control arrangement in which the optimum engine speed is pre-selected for effecting a desired throughput, with fuzzy logic being used to generate membership or associative functions for the input variable(s) of the control circuit and determines output values from a controller with which the forward propulsion speed is controlled.

Still another object of the invention is to provide a harvesting machine, as set forth in the immediately preceding object, wherein the control arrangement includes a control including fuzzy logic for varying the speed with which crop is conveyed to a crop processor. A further refinement of this object is to equip the harvesting machine with a crop accumulator or buffer located upstream from the crop processor and from which crop may be dispensed by a variable speed screw conveyor so as to maintain a steady flow of crop to the crop processor, with the flow of crop being monitored by measuring the thickness of the mat of crop by continuously measuring the distance between a pair of feed rolls provided downstream of the buffer and upstream of the crop processor, the buffer being operational to equalize short and medium term fluctuations in the rate of the crop taken up. The fill level of the buffer can also be detected by means of a sensor, whose output signal is transmitted to a control circuit, that controls the forward propulsion speed of the harvesting machine and/or the speed of the conveyor in such a way that a threshold value of the fill level of the crop in the buffer is reached as much as possible without under running. This control circuit is, in particular, the fuzzy logic controller described above, but may also be a non-fuzzy logic. As an alternative to the signal from the fill sensor, a deviation between the signal and a signal that corresponds to a predetermined fill level, can be transmitted to the fuzzy logic controller. The time differential of the signal or of the aforementioned deviation, which however, are identical, since the predetermined fill level is constant, can also be transmitted to the fuzzy logic controller. The variable speed of the conveyor may be accomplished by a hydrostatic drive including a hydrostatic pump having a swashplate which may be controlled electronically either directly or through a servo motor.

These and other objects will become apparent from a reading of the ensuing description together with the appended drawings.

DESCRIPTION OF THE PREFERRED EMBODIMENT

Figure 1:
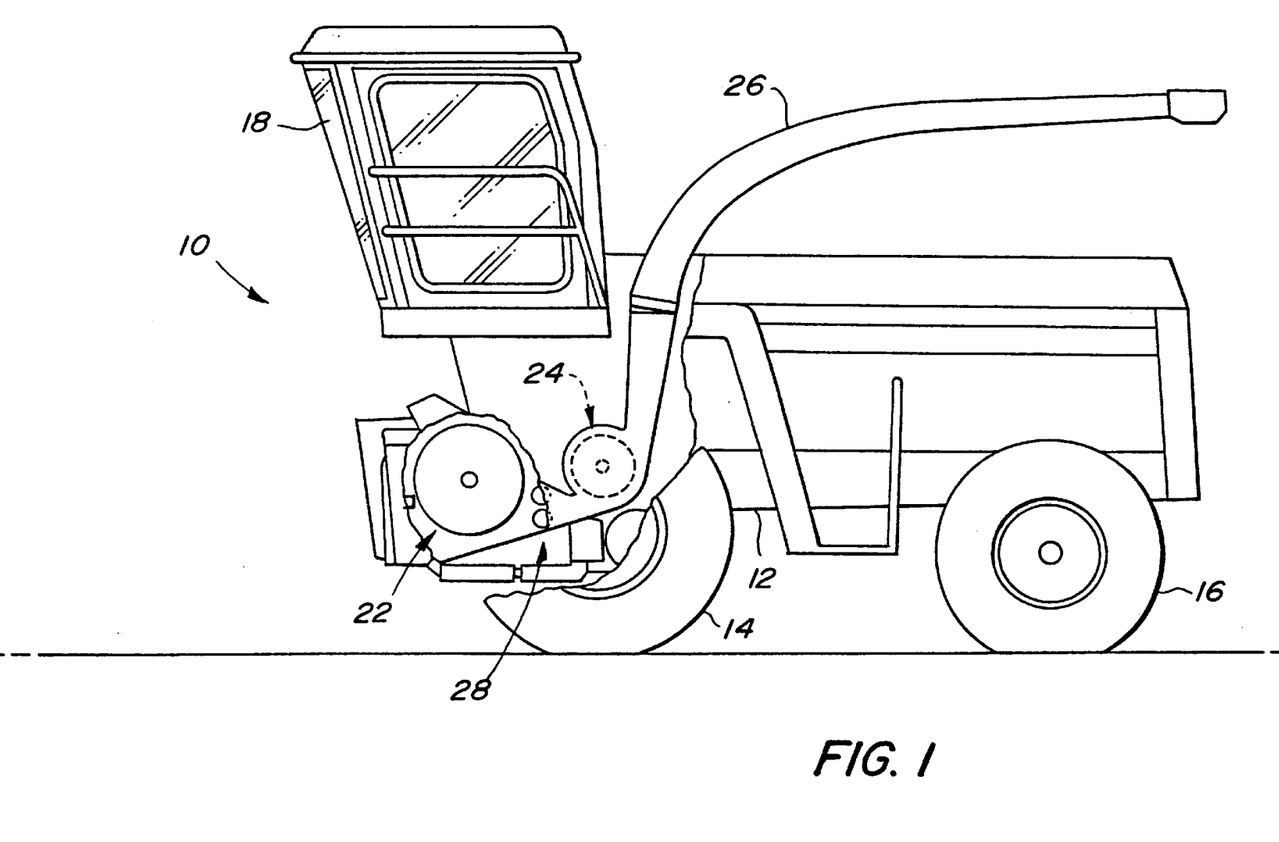
FIG. 1 is a schematic left side view of a harvesting machine.

A first embodiment of a harvesting machine 10 is in the form of a self-propelled forage harvester supported on a frame 12 that is carried by front and rear wheels 14 and 16. The operation of the harvesting machine 10 is performed from an operators cab 18 from which a crop intake arrangement, not shown in FIG. 1, may be viewed while being controlled. Crop taken up from the ground by means of the crop intake arrangement, for example, corn, grass or the like, is conducted to a chopper drum 22 which chops it into small pieces and transmits it to a conveyor arrangement 24. The crop leaves the harvesting machine 10 to an accompanying trailer through a discharge duct 26 which may be pivoted about an upright axis. Between the chopper drum 22 and the conveyor arrangement 24 a post-chopper reducing arrangement 28 extends, through which the conveyed crop is conducted tangentially to the conveyor arrangement 24.

Figure 2:
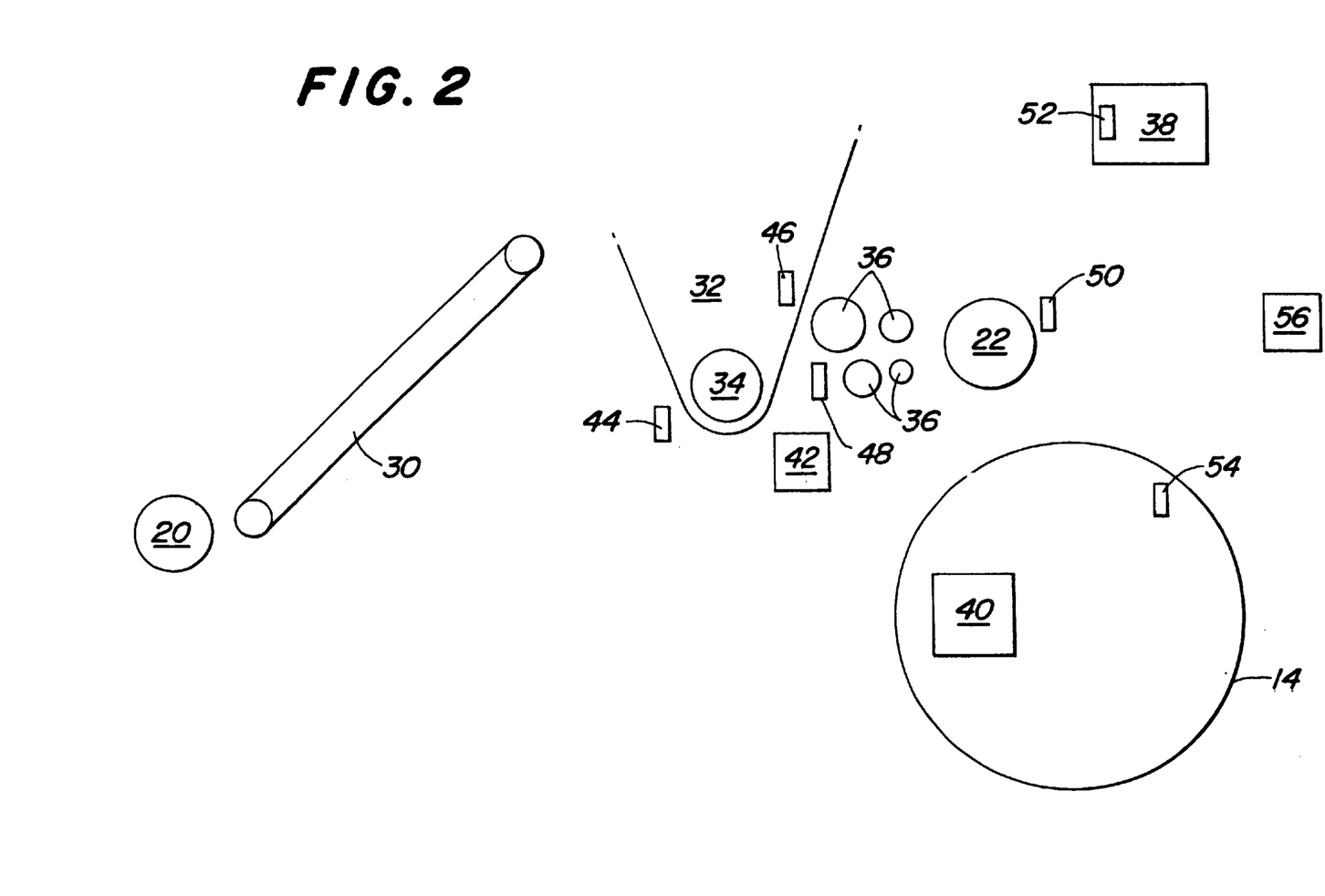
FIG. 2 is a schematic vertical longitudinal sectional view taken through a harvesting machine having a front harvesting attachment.

Referring now to FIG. 2, there is shown a crop intake arrangement 20, that may, for example, be a pick-up known in itself, a mower-chopper, picker or front mower attachment, that takes up crop from the ground, or cuts it off, and conducts it to a conveyor belt 30 that is driven. The crop is brought by the conveyor belt 30 into a buffer 32, that is used for temporary storage of the crop before further processing. In some types of front harvesting attachments, for example, mower-choppers or pickers, the conveyor belt 30 can be eliminated and the crop may be conveyed from the front harvesting attachment 20 directly into the buffer 32. A screw conveyor 34 is arranged at the bottom of the buffer 32, which successively takes crop out of the buffer 32 and conducts it to two pairs of pre-compression rolls 36 arranged such that one pair is behind the other. The pre-compression rolls 36 convey the crop to the chopper drum 22 which chops it and conducts it through the post-chopper reduction arrangement 28 and the conveyor arrangement 24, and then through the discharge duct 26 to the accompanying trailer. A main engine 38, that usually is an internal combustion engine (Diesel engine), drives the individual arrangements with which the crop is transported and processed. For forward propulsion of the harvesting machine 10, a hydrostatic propulsion drive 40 is arranged at the front wheels 14, the drive is loaded with pressurized hydraulic oil from an oil pump, not shown, driven by the man engine 38. The forward propulsion speed attained by the propulsion drive 40 of the harvesting machine 10 is variable, which is performed in a manner known in itself by means of a swash plate in the propulsion drive 40 or by variation in the oil pressure, with which the propulsion drive is loaded. The screw conveyor 34 is also provided with a hydrostatic drive 42, whose speed can be varied. The buffer 32 with the screw conveyor 34 can be rigidly mounted on the harvesting machine 10, where the front harvesting attachment 20 (and, if necessary, the conveyor belt 30) is then preferably fastened to the harvesting machine 10 so as to be removable. As an alternative, the buffer 32 with the screw conveyor 34 is connected (permanently or so as to be removable) to the front harvesting attachment 20 attached to the harvesting machine 10 so as to be removable. The last named solution has the advantage that it can be applied to existing harvesting machines that are not equipped with a buffer 32.

A number of sensors are provided for the control of the harvesting machine 10. A rotational speed sensor 44 measures the rotational speed of the screw conveyor 34. A fill level sensor 46 detects the fill level of the buffer 32 with harvested crop. A roll spacing sensor 48 measures the spacing between two interacting pre-compression rolls 36; this distance is a measurement of the amount of crop conducted to the chopper drum 22, which additionally is a function of the rotational speed of the pre-compression rolls 36, which can also be measured or adjusted. Such a sensor is known from U.S. Pat. No. 5,795,221, granted to Diekhans on Aug. 18, 1998. A further rotational speed sensor 50 measures the rotational speed of the chopper drum 22, which is driven directly mechanically by the main engine 38 or hydraulically by means of a hydrostatic drive. Furthermore, the rotational speed of the main engine 38 is measured by a rotational speed sensor 52 and a forward propulsion speed sensor 54 measures the forward propulsion speed of the front wheel 14, which corresponds to that of the harvesting machine 10. All the aforementioned sensors are connected over so-called CAN bus with a control circuit 56, which is shown in FIG. 5.

Figure 3:
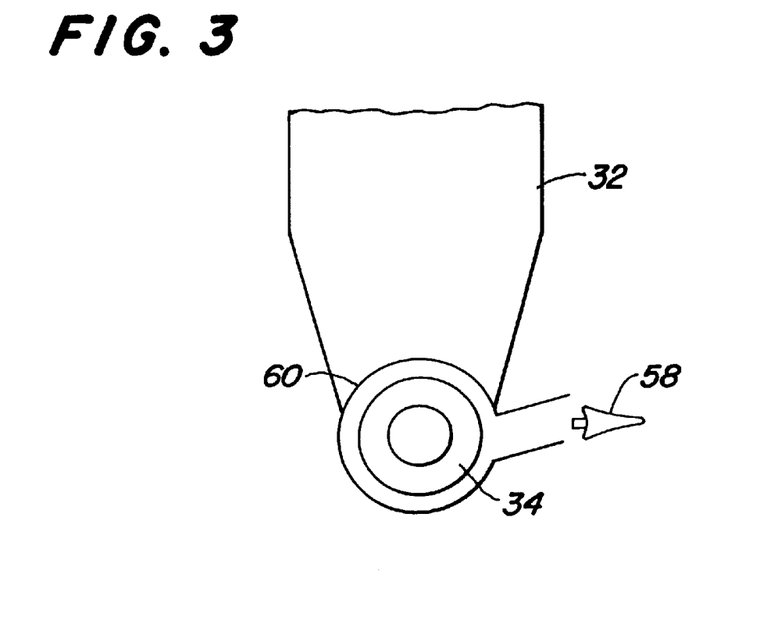
FIG. 3 shows a vertical section through the screw conveyor of FIG. 2.
Figure 4:
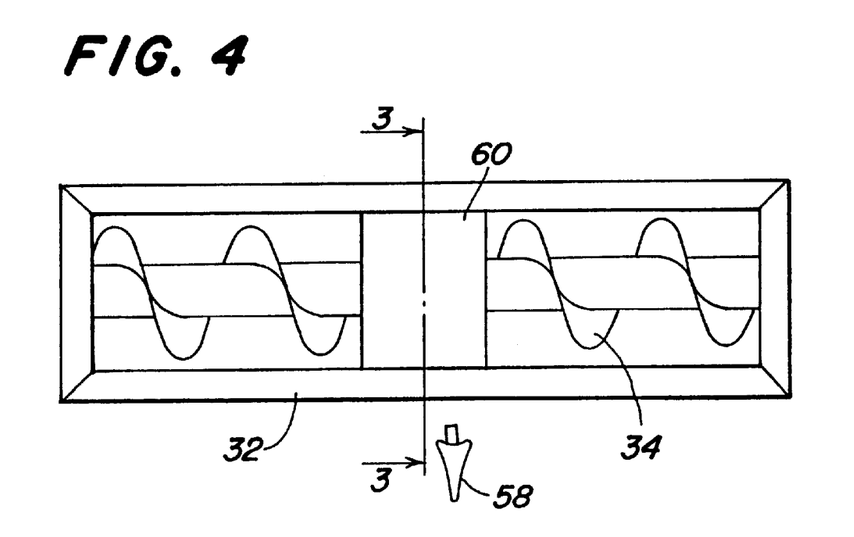
FIG. 4 is a top view of the screw conveyor of FIG. 2.

The screw conveyor 34 is shown in greater detail in FIGS. 3 and 4. The screw conveyor 34 conveys harvested crop in the direction of the arrow 58 out of the buffer 32 and conducts it to the pre-compression rolls 36. As can be seen from FIG. 4, the harvested crop is conveyed by the screw conveyor 34 axially with respect to the forward propulsion direction of the harvesting machine 10 from left and right to the output region in the lower region of the buffer 32 The output region is compartmentalized by a cover 60 from harvested material in the butter 32 lying above it. The output region of the screw conveyor 34 is configured as a so-called centrifugal conveyor, which conveys harvested material in the direction of the arrow 58 radially from the screw conveyor 34 into the pre-compression roll channel of the harvesting machine 10. Since the screw conveyor 34 naturally conveys a relatively constant mass flow, various rates of throughput can be obtained by varying the rotational speed of the screw conveyor 34. The improvement over commercially available front harvesting attachments for taking up and conveying harvested crop, for example, grass, lies in the controllable and continuous conveying performance of the screw conveyor 34.

Figure 5:
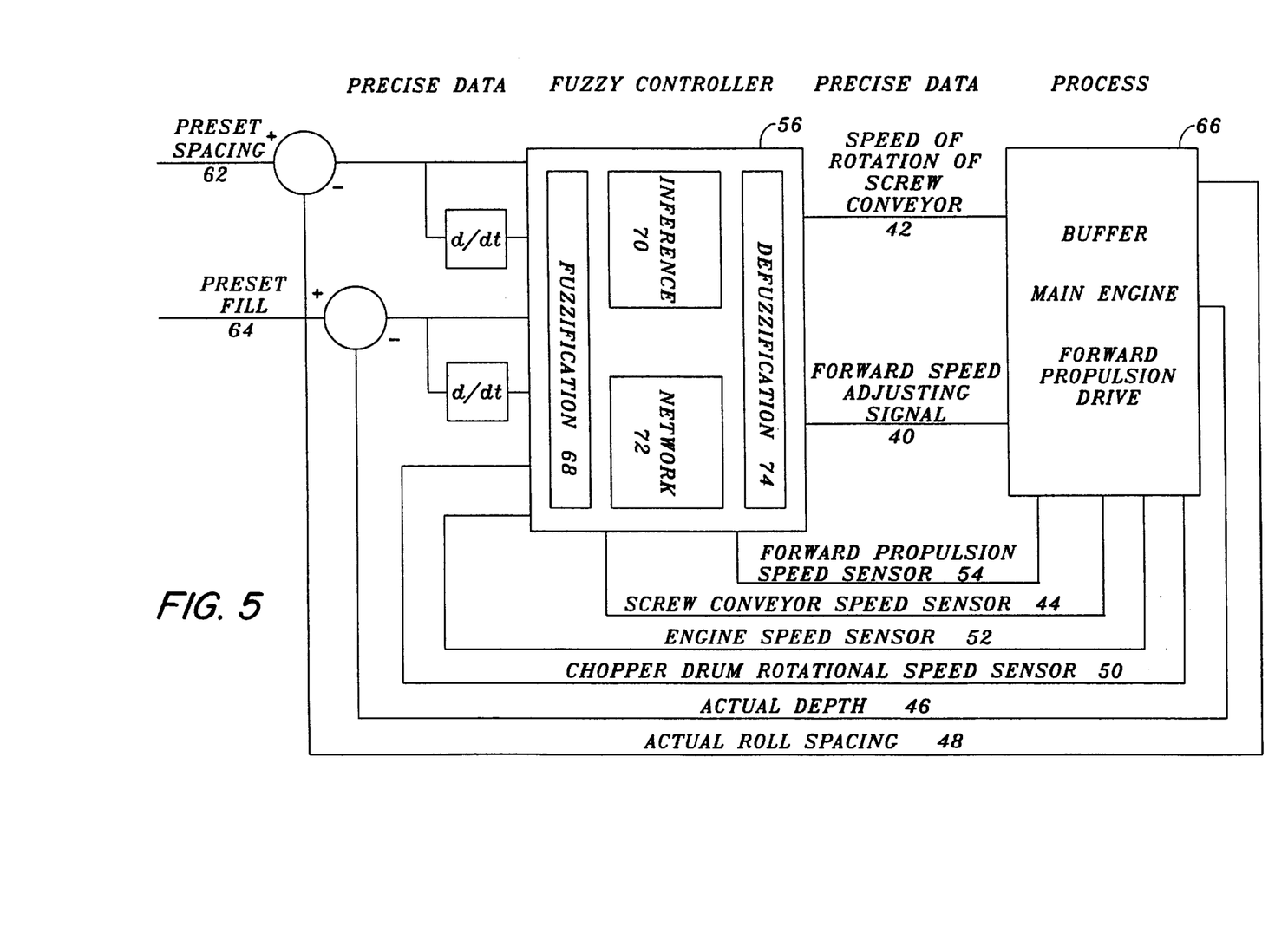
FIG. 5 a block diagram of a control system of the harvesting machine.

FIG. 5 shows a block diagram of the control system with the control circuit 56 that can be configured as a microprocessor or controller with corresponding control software. The control circuit 56 is a fuzzy logic controller (non-precise logic), which is supplied with two process values as input values. On the one hand, these input values are the differential between a pre-set spacing between the pre-compression rolls 36, and the actual spacing, measured by means of roll spacing sensor 48 between the pre-compression rolls 36, and, on the other hand, the difference between a pre-determined target fill level in the buffer 32 and the actual fill level in the buffer 32, which is measured by means of the sensor 46. As previously noted, the spacing between the pre-compression rolls 36 is a measure of the mass throughput of the harvesting machine 10, that is, the volume of harvested crop processed per unit of time. The desired throughput can be firmly pre-set or can be provided as input by a user; this target spacing is transmitted to an input connection 62 of the control circuit 56. The target fill level in the buffer 32 can also be provided by the operator of the harvesting machine as input or permanently pre-set at an appropriate value; it is transmitted to the control circuit 56 as an input connection 64. The control circuit 56 has two outputs, specifically a rotational speed adjusting signal that predetermines the rotational speed of the screw conveyor 34, shown in the drawing as a constant conveyor, and a propulsion speed adjusting signal, with which the speed of the hydrostatic drive 40 of the wheel 14 is controlled. Thereby the control circuit 56 controls the rotational speed of the screw conveyor 34 and the forward propulsion speed of the harvesting machine 10.

The rectangle shown at the right in FIG. 5 indicates a process 66 that reproduces the taking up and processing of the harvested crop with the application of buffer 32, main engine 38 and forward propulsion drive 40. Initial values of this process are the forward propulsion speed measured with the forward propulsion speed sensor 54, the rotational speed of the screw conveyor 34 measured with the rotational speed sensor 44, the rotational speed of the main engine 38 measured with the rotational speed sensor 52, the rotational speed of the chopper drum 22 measured with the rotational speed sensor 50, as well as the fill level of the buffer 32 measured with the sensor 42 and the spacing between the compression rolls 36 measured with the roll spacing sensor 48. The latter can also be used for measurement of the yield and for recording. The measured values of all six aforementioned sensors are transmitted to the control circuit 56.

The control circuit 56 contains a so-called fuzzy logic controller that is composed of the partial systems fuzzification 68, inference 70, control net work 72, and defuzzification 74. Following is the method of operation of the control circuit 56. From the process 66 to be controlled, the fuzzy logic controller is supplied with system magnitudes (process magnitudes) as initial magnitudes. These are exact (precise) signals discrete in time, that the fuzzy logic controller cannot yet understand in view of its non-precise logic. Therefore, in the first step (fuzzification 68) a fuzzification of the precise process magnitudes is undertaken by the fuzzy logic controller, 56, in that by the use of membership functions an index number is associated with each initial magnitude, that defines a measure for the association of the immediate actual combination of values of the initial magnitudes to various non-precise amounts (fuzzy sets). In that way, it can happen that one or more precise initial magnitudes(s) with various membership factors can be associated with several fuzzy sets, where for a number the degree of association can be greater than for another. The definition of the membership functions can be performed heuristically or based on a model.

The core of the control is composed of "if-then" rules. The "if" part (condition part) of the rules consists of the logical linkage of fuzzy sets, which are linguistic, non-precise circumscriptions of amounts, that ascribe certain characteristics to the initial magnitudes. The "then" part (consequence) consists of a non-precise, linguistic circumscription how the output magnitudes of the controller should be shaped on the basis of the characteristics of the input magnitudes. Therefore the rule base 72 is a linguistic non-precise description of expert knowledge on the basis of which the controller makes its decisions, which adjusting magnitude it transmits to the process 66.

In the second phase, the inference 70, the fuzzy logic controller initially determines which condition cases ("if" parts) of the "if-then" rules defined in the rule base, apply to the actual situation at the inputs to the controller (so-called matching). The matching process finds all applicable rules for a certain combination of values of the input magnitudes in that it considers all index numbers for all fuzzy sets of these input magnitudes, that are greater than zero. After the matching process, therefore, a selection has been made as to which rule applies among all the rules of the rule base 72 for the given input magnitude combination. The following step is the actual inference algorithm. In it, an index number for the logical linkage of these fuzzy sets is calculated, that is, for the operating part of the rules in order to quantify the certainty, with which the various condition parts of the rules apply to the particular input magnitude situation. For the inference algorithm itself several operating parts of the rules with various membership factors are available. The inference mechanism 70 applies weighting to the conclusions of the rules that corresponds to the immediate membership factor of the condition part in order to quantify the applicability of various conclusions. It forms the so-called implied fuzzy sets. After this process has been performed for each identified rule, several proposals are available for the controller output magnitudes, to which various weighting factors apply.

In the last step, the fuzzy logic controller composes a single conclusion from all weighted proposals for the output magnitude of the controller (final conclusions), which then is applied as controller output magnitude. This step is designated as defuzzification 74 and there are several defuzzification methods, to calculate the controller output magnitude. This output magnitude is again an exact (precise) value that is directly transmitted to the process.

The fuzzy logic control algorithm applies only the deviations from the rules and their variations with time as input magnitudes. The remaining input data are required for monitoring and control algorithms, that also run in the control circuit 56 but not in the fuzzy logic controller. They are used to calculate the throughput of harvested crop as well as for the monitoring of the entire harvesting and conveying process.

Controller output magnitudes are an adjusting signal for a change in the rotational speed of the screw conveyor 34 as well as an adjusting signal for a change in the propulsion speed of the harvesting machine 10. Further characteristics of the control system are extensive diagnostic and indicating capabilities as well as a calibrating operating mode and the ability to pre-select a certain mass throughput, that is maintained at a constant level by the control system.

The calculation of the controller output magnitudes is performed as explained above, here it should be noted that the controller has four input magnitudes (the difference between target and actual spacing of the compression rolls 36, its time differential, the difference between target and actual fill level of the butter 32 as well as its time differential) and two output magnitudes. Hence, this is a multiple input multiple output (MIMO) system. A considerably simplified method of operation of the controller can be defined.

Specifically, in case the fill level of the buffer 32 has declined below a certain threshold value, the forward propulsion speed of the harvesting machine should be increased until the full level has again reached an adequate value. The fill level of the buffer 32 must be such that the screw 34 is always loaded with material.

In case the spacing of the pre-compression rolls 36 deviates from the pre-set value, then the rotational speed of the screw conveyor 34 is changed to conform; that is, it must be increased if the spacing falls below the target spacing and is corrected downward if the spacing increases above the target spacing.

A better response of the control system is attained by the inclusion of the changes in time of the deviations from the control value.

Figure 6:
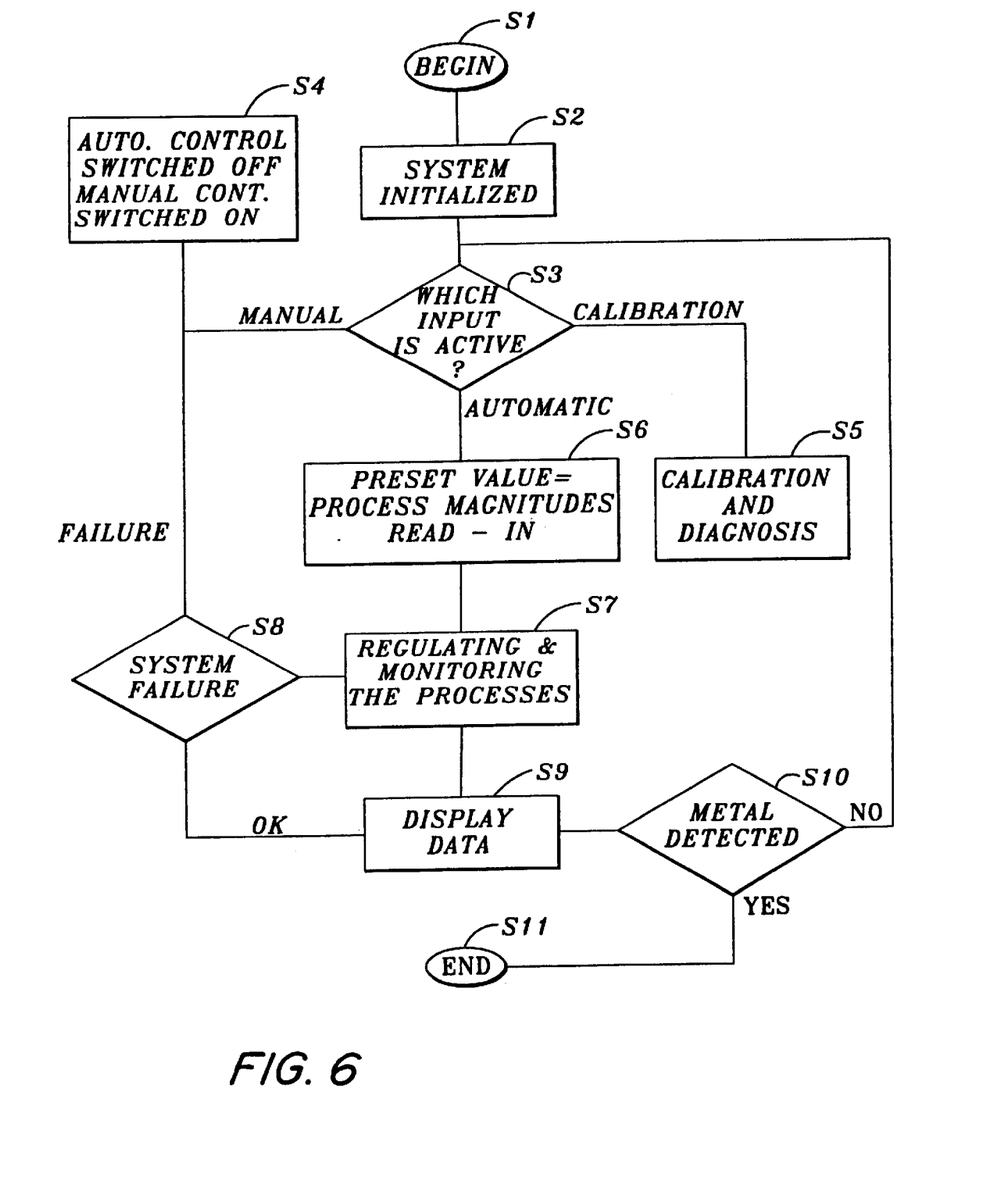
FIG. 6 is a program sequence of the control system.

Referring now to FIG. 6, it can be seen that after the start step S1, for example, after the starting of the harvesting machine 10, the control circuit is initialized in step S2, that is, the programs and data required by the control circuit 56 are retrieved from permanent memory. Step S3 inquires which operator input is currently active. There are three options, namely, manual control, automatic control and calibration. If manual control is selected, step S4 follows, in which the automatic control system is turned off, and the forward propulsion speed is controlled manually. If calibration is selected, step S5 follows, in which a calibration and diagnosis of the functions of the control system are performed. If automatic control is selected, step S6 follows, in which the target values are retrieved, in particular the rate for the particular crop harvested. After that, in step S7, the harvesting process is regulated and monitored in the manner described above. Here, step S8 determines regularly whether a system failure exists. If this is the case, step S4 follows, that is control is shifted to manual control. Alternatively, if there is no system failure, that is everything is in order, step S9 follows, in which the actual data are displayed on an indicator arrangement in the operator's cab 18. Hence, the operator can read, for example, the forward propulsion speed, and the rate and total amount of crop harvested. Step S10 follows, which inquires whether a metal detector, arranged in one of the pre-compression rolls 36, has detected ferromagnetic material. In case metal has been detected, step S11 follows with the end of the process, since the operator must stop the harvesting machine 10 and remove the metal. Otherwise step S3 again follows.

Figure 7:
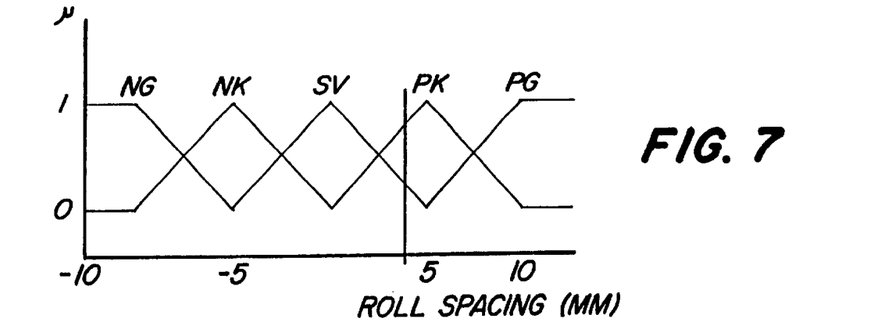
FIG. 7 is a graph showing an membership function for the spacing between feed rolls.
Figure 8:
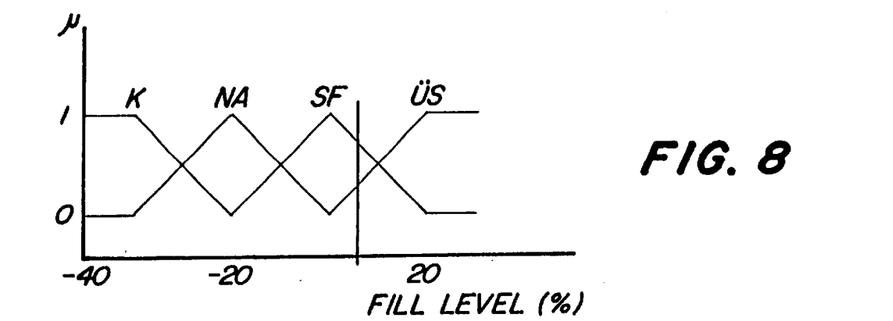
FIG. 8 is a graph showing an membership function for the fill level of a buffer.

In the following, the principle of the control circuit 56 with a fuzzy logic controller is explained on the basis of an example. Accordingly, the fuzzification 68 employs the one-dimensional, triangular membership functions for the input magnitudes of the roll spacing and fill level, shown in FIGS. 7 and 8. Five fuzzy sets are provided for the roll spacing, in particular, negative large (NG), negative small (NK), target (SA), positive small (PK) and positive large (PG). Therefore, the range of the values for the roll spacing is subdivided with the membership function shown in FIG. 7 non-precisely into five amounts. For the fill level of the buffer 32, four fuzzy sets are provided. Specifically critical (K), still adequate (NA), target (SB) and over target (ÜS). The range of values for the fill level has been subdivided non-precisely into four amounts with the membership function shown in FIG. 8. Two matrices result thereby with a dimension 5×4 for the controller output values in the rule base 72.

The rule base 72 for the two output magnitudes of the controller could result in a matrix P1 that appears as follows:

|     | NG | NK | SV | PK | PG |
| --- | --- | --- | --- | --- | --- |
| K   | θ1 | θ1 | θ1 | θ1 | θ1 |
| NA  | θ2 | θ2 | θ2 | θ2 | θ2 |
| SF  | θ4 | θ4 | θ4 | θ4 | θ4 |
| ÜS  | θ3 | θ3 | θ3 | θ3 | θ3 |

In the above table, the roll spacing values form the columns and the fill level values the rows. The table defines the change in the adjusting angle of the hydraulic pump for the forward propulsion drive 40 as a function of the roll spacing and of the fill level. The meaning of the angle θ is such that at θ1 the adjusting angle of the hydraulic pump for the forward propulsion drive 40 is sharply increased, so that the forward propulsion speed increases sharply. At θ2 the adjusting angle is increased somewhat, at θ3 it is decreased somewhat and at θ4 it remains unchanged. In place of the change of an angle, the adjustment of the forward propulsion speed can be performed in any other desired way.

The adjusting signal for the speed of the screw conveyor 34 results in a second matrix P2, that defines the change in the adjusting angle for the drive 42 of the screw conveyor 34 as a function of the roll spacing and of the fill level:

|    | NG  | NK  | SV  | PK  | PG  |
|----|-----|-----|-----|-----|-----|
| K  | Ψ5  | Ψ5  | Ψ5  | Ψ3  | Ψ4  |
| NA | Ψ1  | Ψ2  | Ψ5  | Ψ3  | Ψ4  |
| SF | Ψ1  | Ψ2  | Ψ5  | Ψ3  | Ψ4  |
| ÜS | Ψ1  | Ψ2  | Ψ5  | Ψ3  | Ψ3  |

In this table, the roll spacing also forms the columns and the fill level the rows. The angles Ψ have the meaning, that with Ψ1 the adjusting angle is sharply increased, that is, the conveying speed is sharply increased. With Ψ2, the adjusting angle is increased somewhat, with Ψ3 it is reduced somewhat, with Ψ4 it is reduced sharply and with Ψ5 it remains constant. Here too, the variation of the conveying speed may be performed instead of a variation in the angle, by any other desired means.

From the non-precise values of the adjustment magnitudes, two precise adjustment values (controller output values) are determined with the aid of a classical defuzzification method (for example, center of gravity method), which is explained in the following on the basis of a sample pair of values. In case the roll spacing is 4 mm (corresponds to the fuzzy value "too large") and the fill level of +5% is increasing ("too much"), the corresponding values of the membership functions can be read from FIGS. 7 and 8.

Figure 9:
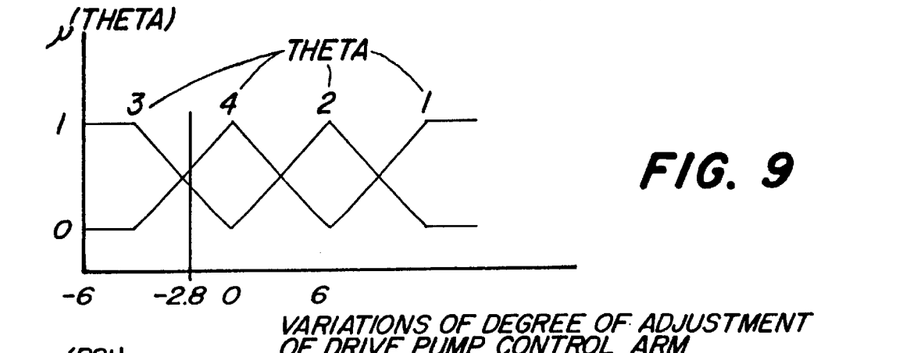
FIG. 9 is a graph showing the angle adjustment for the propulsion drive.
Figure 10:
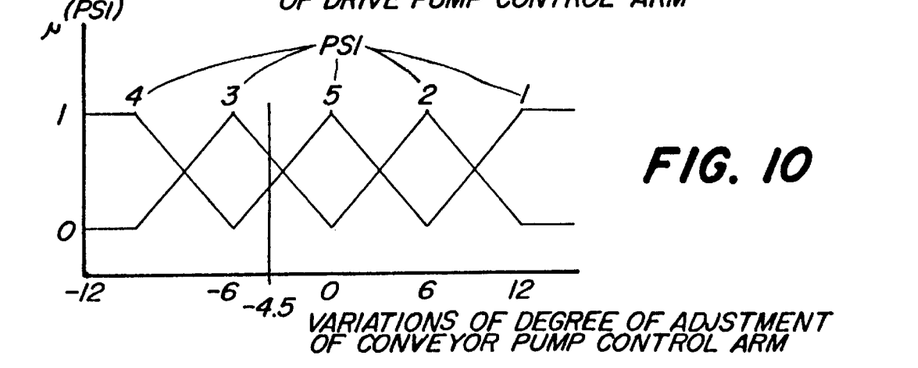
FIG. 10 is a graph showing the angle adjustment for the drive of the screw conveyor.

For the roll spacing, an association can be found as $\mu=0.8$ for positive small (PK) and $\mu=0.2$ for target value (SV). For the fill level, the result is $\mu=0.6$ for target value (SF) and $\mu=0.4$ for over target value (ÜS). The matching process discovers that the amounts PK, SV, SF, and ÜS apply to the input value situation. Therefore, all rules with the linkage to these amounts in its conditional part find entry into the calculation of the adjustment value. IN the rule base 72, that is the above matrices, the adjustment values for the forward propulsion speed and the conveyor speed can be read. In each of the two matrices, four target adjustments must be considered. For the individual adjustment values, an membership measure is calculated by the application of the minimum operator "min", that is, in each case the smaller membership measure is used. For the pair of values PK, SF one finds in matrix P2 Ψ3, whose membership measure $\mu$ for PK amounts to 0.8 and for SF amounts to 0.6 (see FIGS. 7 and 8). Therefore, the target value Ψ3 is associated with an membership measure $\mu=0.6$, while for the same pair of values according to matrix P1 results in θ4. The membership measure $\mu$ for θ4 also results in 0.6, calculated with the "min" operator. Analogously, one finds with PK, ÜS, $\mu=0.4$ for θ3 (the minimum of 0.8 and θ4), as well as $\mu=0.4$ for Ψ3 (the minimum of 0.8 and 0.4). With SV, SF there results for θ4 a value for $\mu=0.2$ and for Ψ5 the result is also $\mu=0.2$. With SV, ÜS the result is $\mu=0.2$ for θ3 and $\mu=0.2$ for Ψ5. In case one now obtains for one of the adjustment values various membership measures $\mu$, the maximum is in each case used again, that is with Ψ3 then $\mu$ is set equal to 0.6, which is the maximum out of 0.4 and 0.6. As a result, one obtains for Ψ3–$\mu=0.6$, for Ψ5–$\mu=0.2$, for θ3–$\mu=0.4$ and for θ4–$\mu=0.6$. Therefore, one obtains two non-precise adjustment values for each of the two initial magnitudes. With the aid of the membership functions for the initial controller value, the precise output value can be read. For this purpose, a normalizing on one of the membership mass can be performed so that the sum of the normalized $\mu$ is equal to 1. Here Ψ produces normalized $\mu$ if 0.75 for Ψ3 and 0.25 for Ψ5, here θ results in 0.4 for θ3 and 0.6 for θ4. The normalizing is performed by dividing $\mu$ calculated above by the sum of the $\mu$ for θ or Ψ. Finally, the controller output magnitude can be read from FIG. 9 or 10. For this example, the result is an angle of –2.8° for the forward propulsion speed and –4.5° for the conveyor speed.

Figure 11:
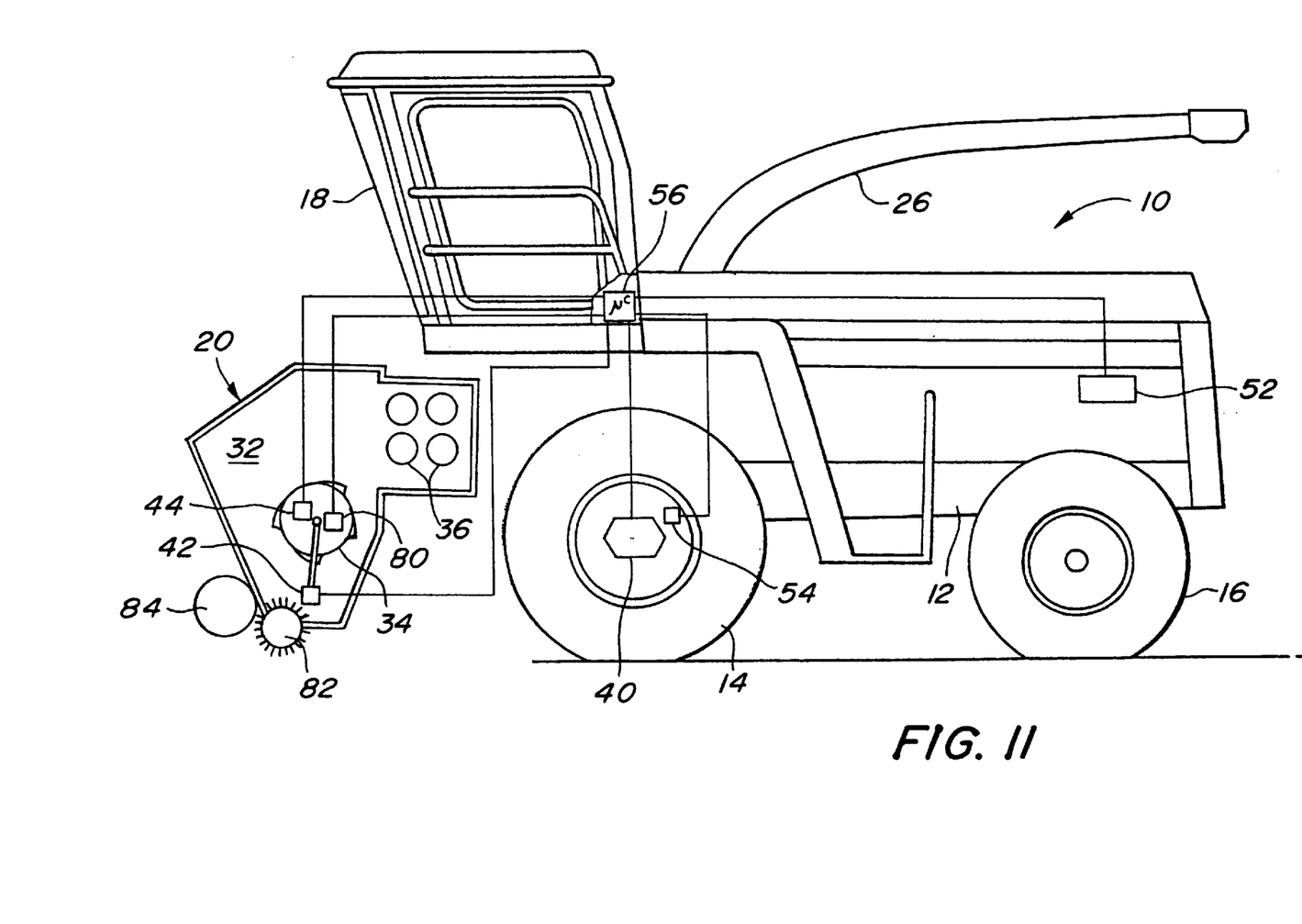
FIG. 11 is a schematic left side view of a harvesting machine according to a second embodiment of the invention.

FIG. 11 shows the harvesting machine 10 in the form of a forage harvester according to a second embodiment of the invention. Components that correspond to components of the first embodiment are identified with the same reference numerals. In the second embodiment, a crop intake arrangement 20 in the form of a pick-up is provided which contains a pair of rolls 82, 84 extending transverse to the direction of forward propulsion for the acceptance from the ground of crop already mowed. The crop is conducted to a screw conveyor 34 that is driven with variable rotational speed by a hydrostatic drive 42 and that conducts the crop from the rolls 82, 84 to the pre-compression rolls 36. Therefore, there is only a relatively small volume available for a buffer 32 underneath the screw conveyor 34. The control circuit 56 is provided with the following input signals: Rotational speed of the main engine by means of the sensor 52, forward propulsion speed by means of the sensor 54, rotational speed of the screw conveyor 34 by the rotational speed sensor 44 and torque of the drive for the screw conveyor 34 by means of a torque sensor 80. /The control circuit 56 is also provided with a fuzzy logic controller, which generates output values with which the forward propulsion speed of the harvesting machine 10 is controlled by means of the hydrostatic propulsion drive 40. In addition, the conveying speed of the screw conveyor 34 is controlled by means of the fuzzy logic controller, which uses the hydrostatic drive 42 with variable rotational speed. The input values for the fuzzy logic controller are the drive torque of the screw conveyor 34 and the rotational speed of the screw conveyor 34, as well as their time differentials. The drive torque for the screw conveyor 34 contains data as to the fill level, since the screw conveyor 34 must be driven with greater power when the fill level is high than at a low fill level. Her it could also be appropriate to provide a sensor for the fill level of the buffer 32 and to connect it to the control circuit 56, as in the first embodiment.

What is claimed is:

1. A harvesting machine, comprising: a variable speed propulsion drive having a controllable drive element which may be selectively operated to change a forward propulsion speed of said machine; a crop intake arrangement; a crop processing arrangement located for receiving crop from said crop intake arrangement; a control circuit having a signal storage location in which is stored a first pre-set input signal having a value corresponding to a desired rate or amount of crop to be processed by said crop processing arrangement; a first sensor forming part of said control circuit and being operable for collecting data representative of the actual rate or amount of crop being taken up by said crop intake arrangement; and said control circuit containing non-precise logic for manipulating said data collected by said first sensor and comparing it with said first preset input signal so as to send a command signal to said controllable drive element so as to modify the forward propulsion speed of said harvesting machine such that the rate of the crop processed by said crop processing arrangement corresponds to said desired rate.

2. The harvesting machine, as defined in claim 1, wherein said control circuit includes at least a second sensor for measuring a variable of the crop flow rate or amount; said non-precise logic generating an membership function for the input variables of the control circuit and determining said command signal with which said controllable drive element is actuated so as to control the forward propulsion speed of said machine.

3. The harvesting machine as defined in claim 1, wherein said crop intake arrangement includes a conveyor; a variable speed conveyor drive coupled to said conveyor and including a second controllable drive element; the control circuit in addition generating a second command signal coupled to said second controllable drive element for controlling the rate at which crop is delivered to said crop processing arrangement by said conveyor.

4. The harvesting machine as defined in claim 1 wherein said crop intake arrangement delivers a mat of crop to said crop processor arrangement; said first sensor measuring the thickness of said mat of crop which is being conducted to the crop processing arrangement and generating and supplying a signal representative of either the actual thickness measured and/or a variation of the output signal of said first sensor that corresponds to a preset value of the thickness, and/or the time differential of the output signal of said first sensor and/or the time differential of the output signal of the sensor and or the time differential of a deviation of the output signal to the first sensor from an output that corresponds to a preset value of said thickness.

5. The harvesting machine, as defined in claim 4, wherein said crop intake arrangement includes upper and lower pre-compression rolls located upstream from said crop processing arrangement; and the sensor for measurement of the thickness being a roll spacing sensor which detects the spacing between two pre-compression rolls.

6. The harvesting machine, as defined in claim 1, wherein said crop intake arrangement includes a buffer for storing crop, a conveyor being associated with said buffer for moving crop away from the buffer, whereby crop is temporarily stored in said buffer before it is conducted to said crop processing arrangement.

7. The harvesting machine, as defined in claim 6, wherein said conveyor is a screw conveyor located in a bottom location of said buffer.

8. The harvesting machine, as defined in claim 6, wherein said conveyor is a screw conveyor having right- and left hand screw sections for delivering crop to a central region of said conveyor; and said central region of said conveyor being equipped with paddles whereby crop is expelled by centrifugal force.

9. The harvesting machine, as defined in claim 1, wherein said crop intake arrangement includes a selectively mountable buffer for temporarily storing crop at a location upstream of said crop processing arrangement.

10. The harvesting machine, as defined in claim 6, and further including a variable speed conveyor drive coupled to said conveyor and including a selectively operated control element; a fill sensor associated with said butter operable for sending an output signal, representative of the crop level in said buffer, to said control circuit, with the latter operating to effect operation of one or the other or both of said controllable drive element or control element to thereby effect a change in the forward propulsion speed of the harvesting machine and/or the conveyor speed of the conveyor, preferably in such a way that a minimum value of the fill level of the crop in the buffer is maintained or exceeded.

11. The harvesting machine, as defined in claim 10, and further including entering a further preset signal in said signal storage location which is representative of a desired fill level in said buffer; and the output signal of said fill level sensor being compared with said further preset signal with a control signal representative corresponding as a deviation from the actual and preset values being processed by said control circuit and used to generate an output signal that is used to control the forward propulsion speed and/or said conveyor speed.

* * * * *

UNITED STATES PATENT AND TRADEMARK OFFICE
CERTIFICATE OF CORRECTION

PATENT NO. : 6,315,658 B1
DATED : November 13, 2001
INVENTOR(S) : Konrad Andreas Weber It is certified that error appears in the above-identified patent and that said Letters Patent is hereby corrected as shown below:

Column 1,
Line 14, replace "EP-377163" with -- EP-0377163 --.
Line 28, replace "DE-2915531-A" with -- DE-2919531-A --.
Line 48, replace "IN" with -- In --.

Column 3,
Line 51, (starting with FIG. 7), replace "an" with -- a --.
Line 53, (starting with FIG. 8), replace "an" with -- a --.

Column 5,
Line 22, "butter" should be replaced with -- buffer --.

Column 7,
Line 37, "butter" should be replaced with -- buffer --.

Column 10,
Line 24, replace "/The" with -- The --.
Line 36, replace "Her" with -- Here --.

Column 11,
Line 19, replace "and or" with -- and/or --.

Signed and Sealed this

Third Day of September, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.   : 6,315,658 B1
DATED        : November 13, 2001
INVENTOR(S)  : Konrad Andreas Weber It is certified that error appears in the above-identified patent and that said Letters Patent is hereby corrected as shown below:

<u>Column 12,</u>
Line 14, "butter" should be replaced with -- buffer --.

Signed and Sealed this

Fifteenth Day of October, 2002

*Attest:*

*Attesting Officer*

JAMES E. ROGAN
*Director of the United States Patent and Trademark Office*